US012188436B1

(12) United States Patent
Dudar

(10) Patent No.: US 12,188,436 B1
(45) Date of Patent: Jan. 7, 2025

(54) METHODS AND SYSTEMS FOR AN EVAPORATIVE EMISSIONS SYSTEM

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/424,217

(22) Filed: Jan. 26, 2024

(51) Int. Cl.
*F02M 25/08* (2006.01)
*F02D 41/00* (2006.01)

(52) U.S. Cl.
CPC ....... *F02M 25/08872* (2013.01); *F02D 41/004* (2013.01); *F02M 25/0836* (2013.01)

(58) Field of Classification Search
CPC ............ F02M 25/0872; F02M 25/0836; F02D 41/004
USPC ........................................................ 123/520
See application file for complete search history.

(56) References Cited

U.S. PATENT DOCUMENTS 8,336,526 B1 * 12/2012 Martin ............... F02M 25/0809 123/518
11,493,001 B1 11/2022 Dudar et al.
2015/0122228 A1 * 5/2015 Bolger .................. F02D 41/004 123/518
2015/0122229 A1 * 5/2015 Dudar ................. F16K 37/0041 73/114.38
2020/0182174 A1 6/2020 Dudar
2023/0191902 A1 6/2023 Dudar

FOREIGN PATENT DOCUMENTS

JP 2022185308 A * 12/2022 ......... F02M 25/0809

OTHER PUBLICATIONS

JP-2022185308-A (Tanida et al.) (Dec. 12, 2022) (Machine Translation) (Year: 2022).*
Halvorson, B., "California plan: 80% EVs by 2035, 50-mile plug-in hybrids, tighter tailpipe emissions," Green Car Reports Website, Available Online at https://www.greencarreports.com/news/1132190_california-plan-80-fully-electric-by-2035-50-mile-plug-in-hybrids-tighter-tailpipe-emissions, May 7, 2021, 25 pages.

* cited by examiner

*Primary Examiner* — Mahmoud Gimie
(74) *Attorney, Agent, or Firm* — Vincent Mastrogiacomo; McCoy Russell LLP

(57) ABSTRACT

Methods and systems are provided for an evaporative emissions system. In one example, a method includes fluidly coupling the evaporative emissions system to an interior volume of a fuel tank in response to a canister load and a fuel tank pressure. The method further includes scaling the evaporative emissions system from atmosphere and an intake manifold.

19 Claims, 9 Drawing Sheets

METHODS AND SYSTEMS FOR AN EVAPORATIVE EMISSIONS SYSTEM

FIELD

The present description relates generally to methods and systems for an evaporative emissions system of a vehicle.

BACKGROUND/SUMMARY

Vehicles may experience shorter engine run times due to the inclusion of electric motors in hybrid vehicles. Shorter engine run times may limit purge events and other events that clean an evaporative emissions system canister and/or mitigate fuel tank pressures.

Some examples include forcing an engine on to consume vapors. However, this reduces customer satisfaction and increases emissions relative to all electric driving. Some other examples include actively increasing a load of the engine so the engine may consume vapors efficiently while charging an energy storage device of the vehicle or power auxiliary components of the vehicle. Neither of these solutions may be satisfactory as they both result in increased fuel consumption beyond that requested by a vehicle operator. Methods and systems different than those already present may be demanded.

In one example, the issues described above may be addressed by a method including fluidly coupling a fuel tank to an evaporative emissions system (evap system) and sealing the evap system from an intake manifold and atmosphere. In this way, a volume of the fuel tank and evap system is increased.

As an example, the fuel tank is fluidly coupled to the evap system when a fuel tank pressure is greater than a threshold fuel tank pressure and an engine load is less than a threshold engine load. The engine load may not be operating at a load that consumes vapors at a rate that may mitigate vapor breakthrough.

As another examples, the fuel tank is fluidly coupled to the evap system when a manifold vacuum is not present. The fuel tank vacuum may be supplied to the canister to fulfill a purging request. In this way, the evap system volume may be used when a fuel tank pressure is greater than an upper threshold fuel tank pressure and a fuel tank volume may be used to purge the canister when a manifold vacuum is not present. These routines may be executed without active modifications to engine operating parameters outside of those occurring in response to drive demand.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
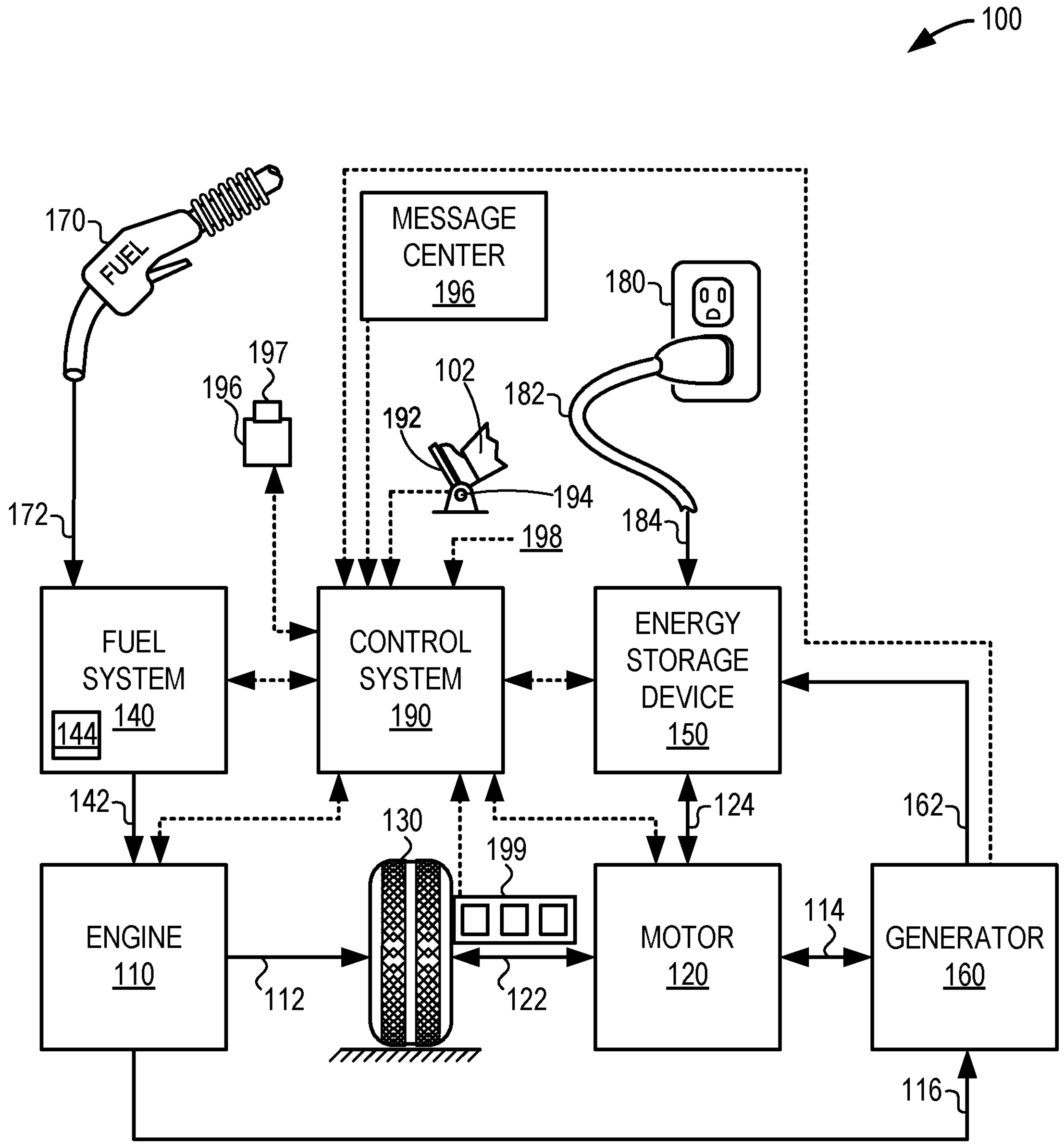
FIG. 1 shows a high-level block diagram illustrating an example vehicle propulsion system.
Figure 2:
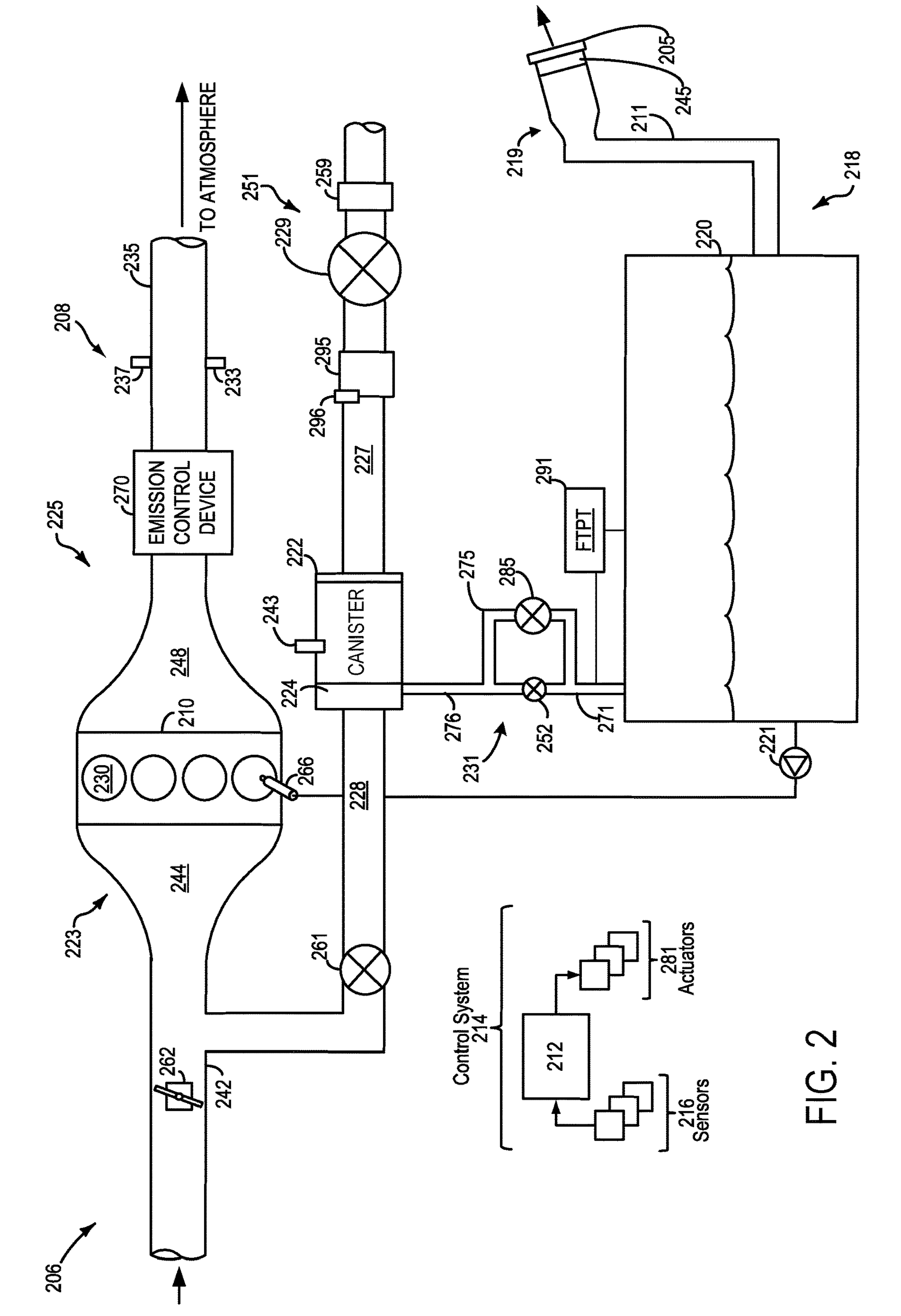
FIG. 2 shows an example engine system, fuel system, and evaporative emissions control (EVAP) system included in the example vehicle system of FIG. 1.
Figure 3B:
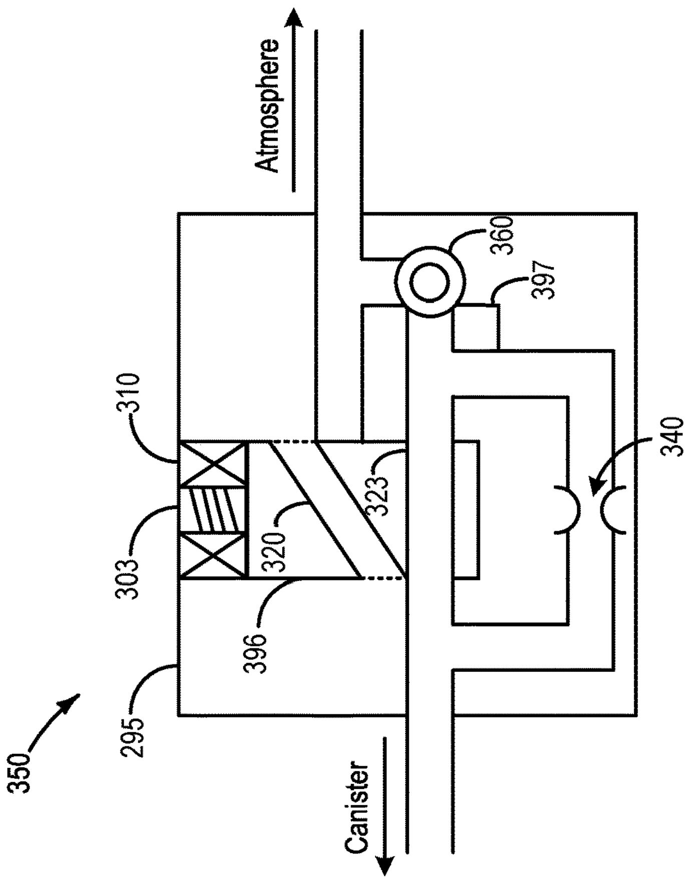
FIGS. 3A and 3B show different positions of a changeover valve (COV) of an evaporative leak check module (ELCM)
Figure 3A:
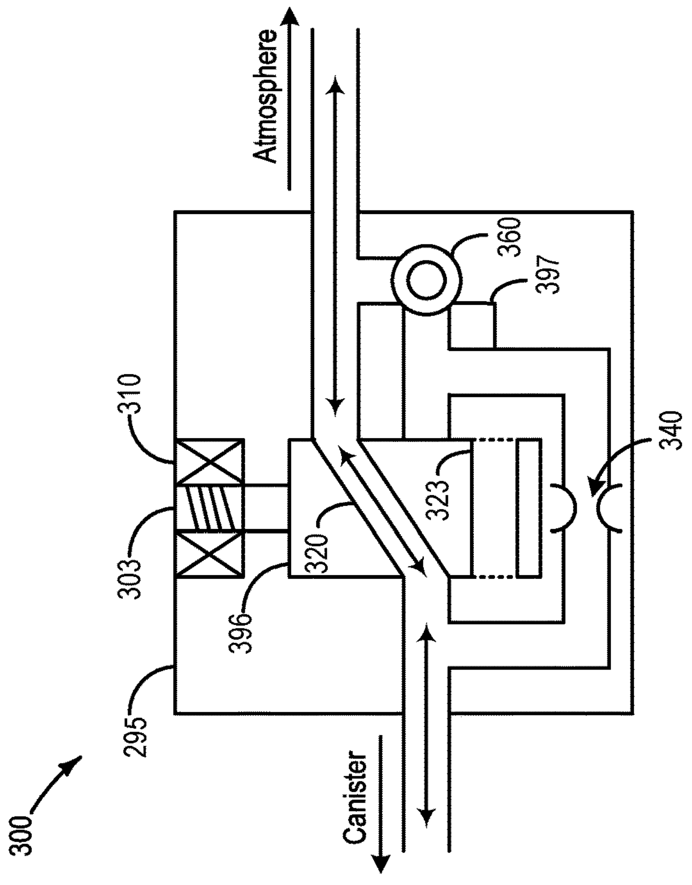
Figure 4A:
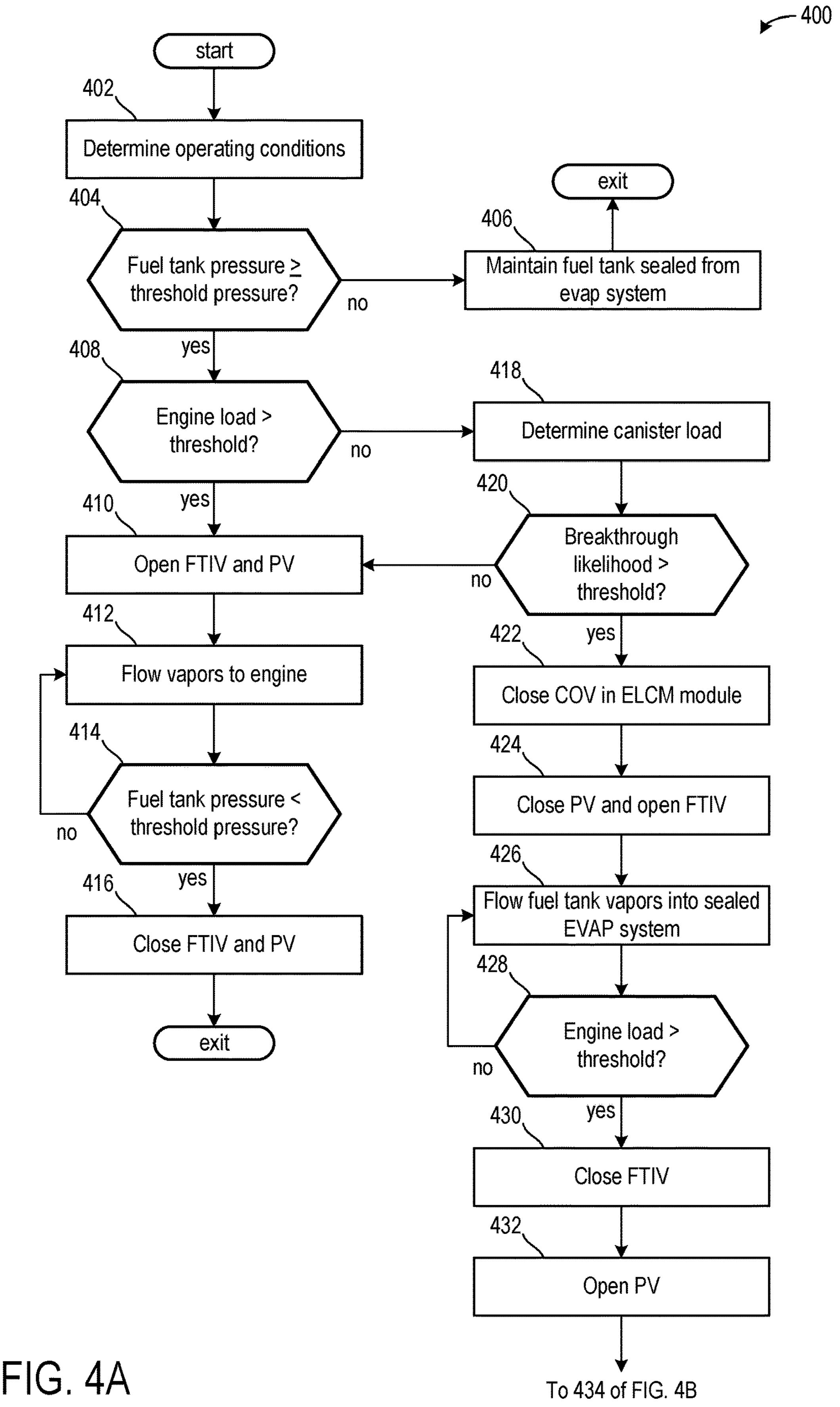
FIGS. 4A and 4B show a method for opening a fuel tank to an evap system when a fuel tank pressure is high and an engine load is low.
Figure 4B:
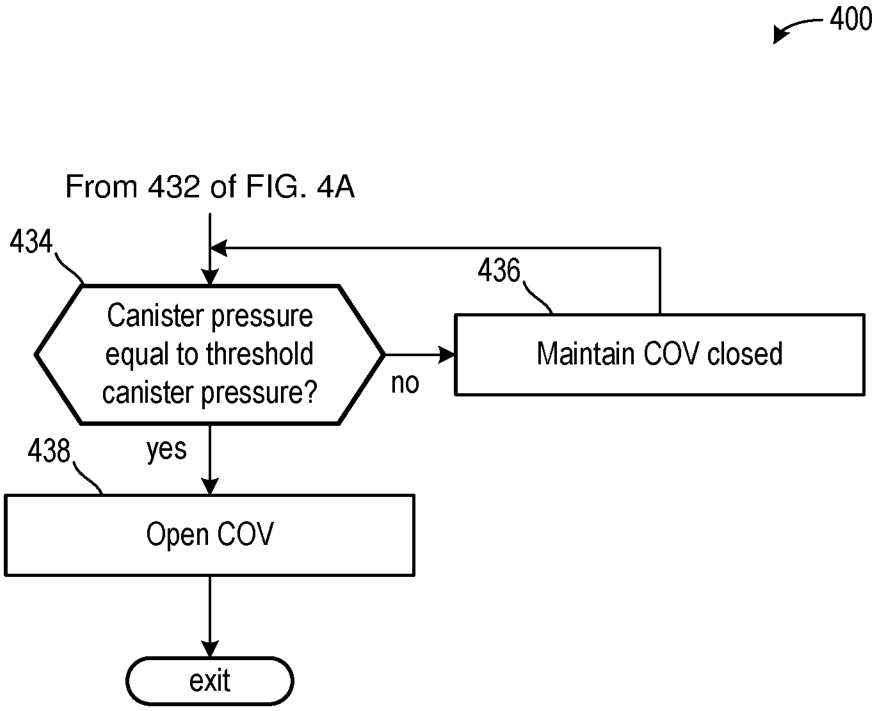
Figure 5A:
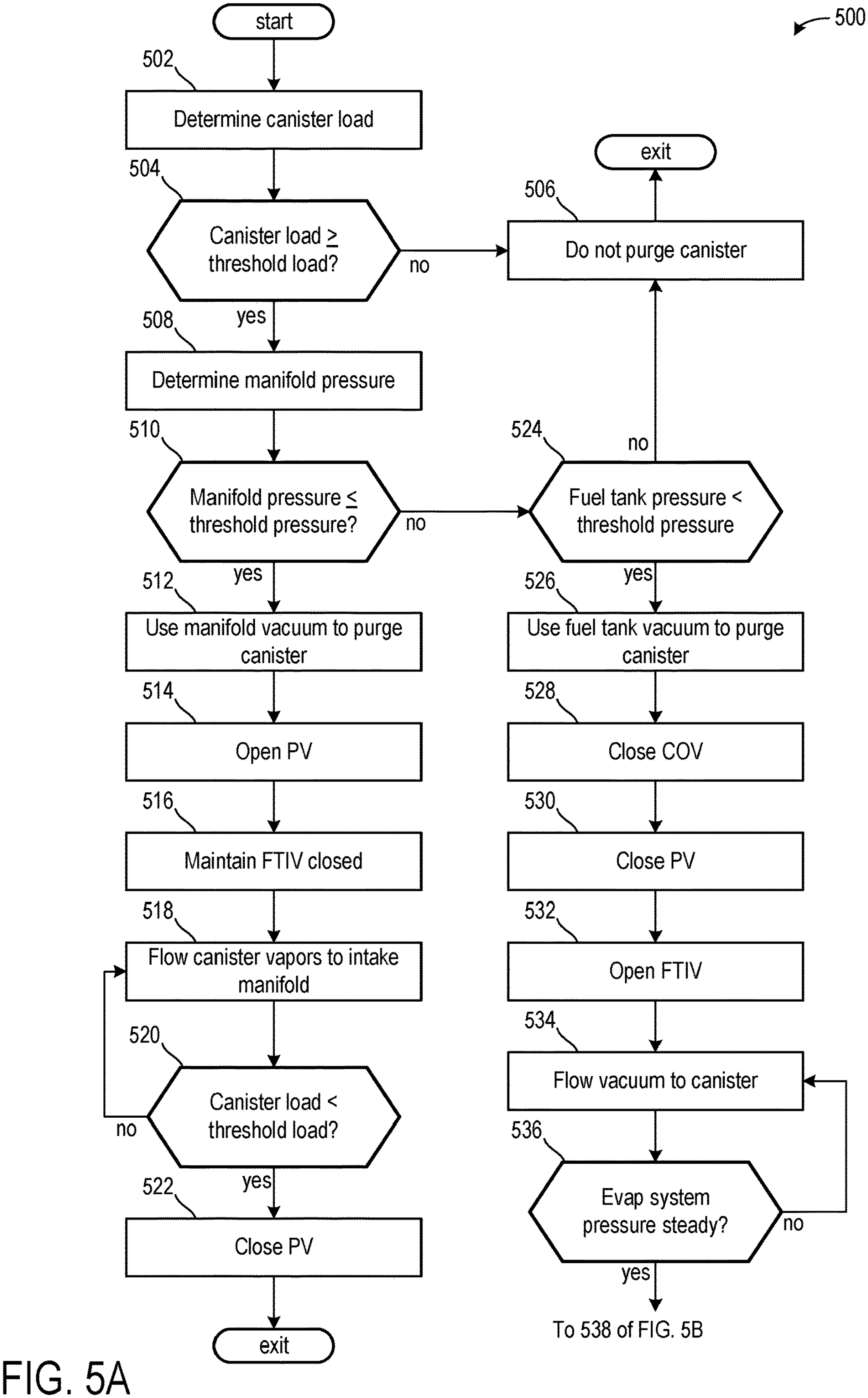
FIGS. 5A and 5B show a method for purging a canister with a fuel tank vacuum.
Figure 5B:
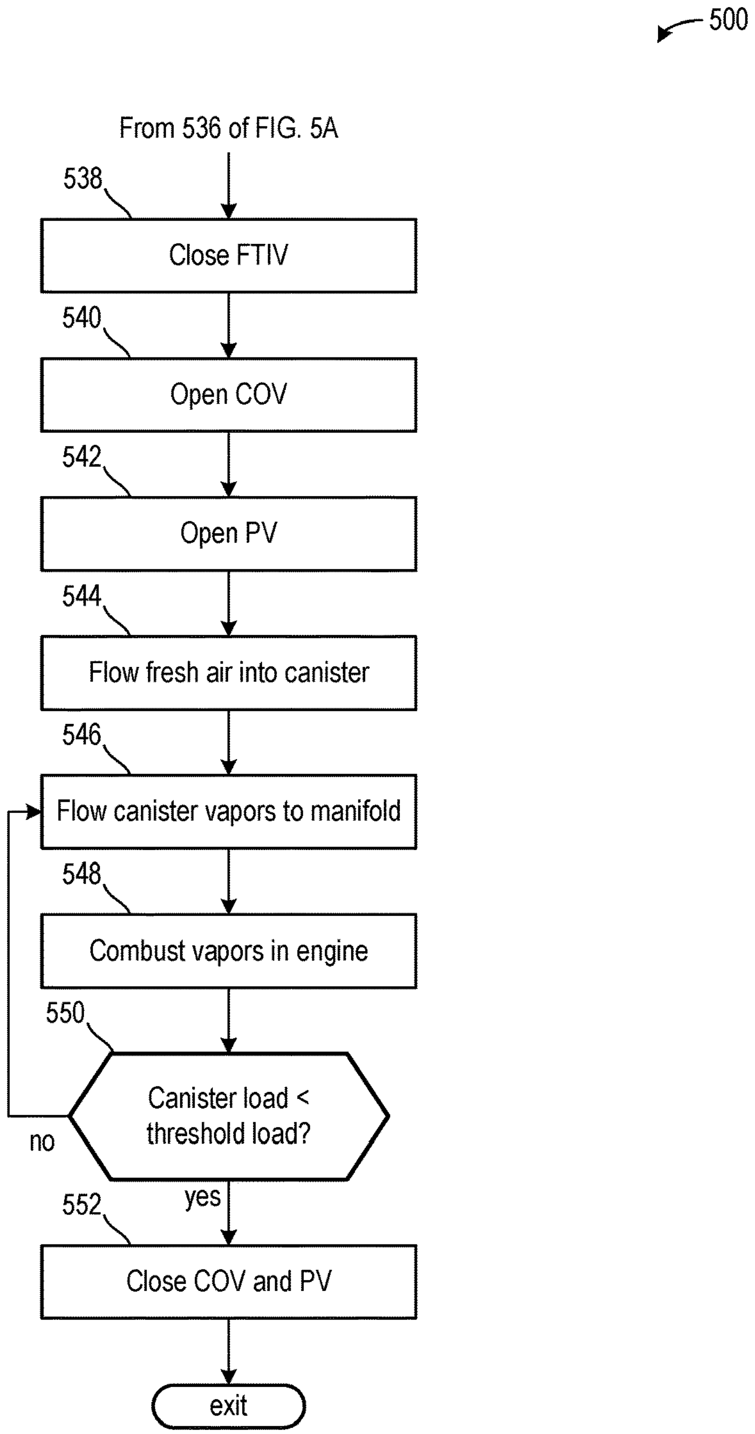
Figure 6:
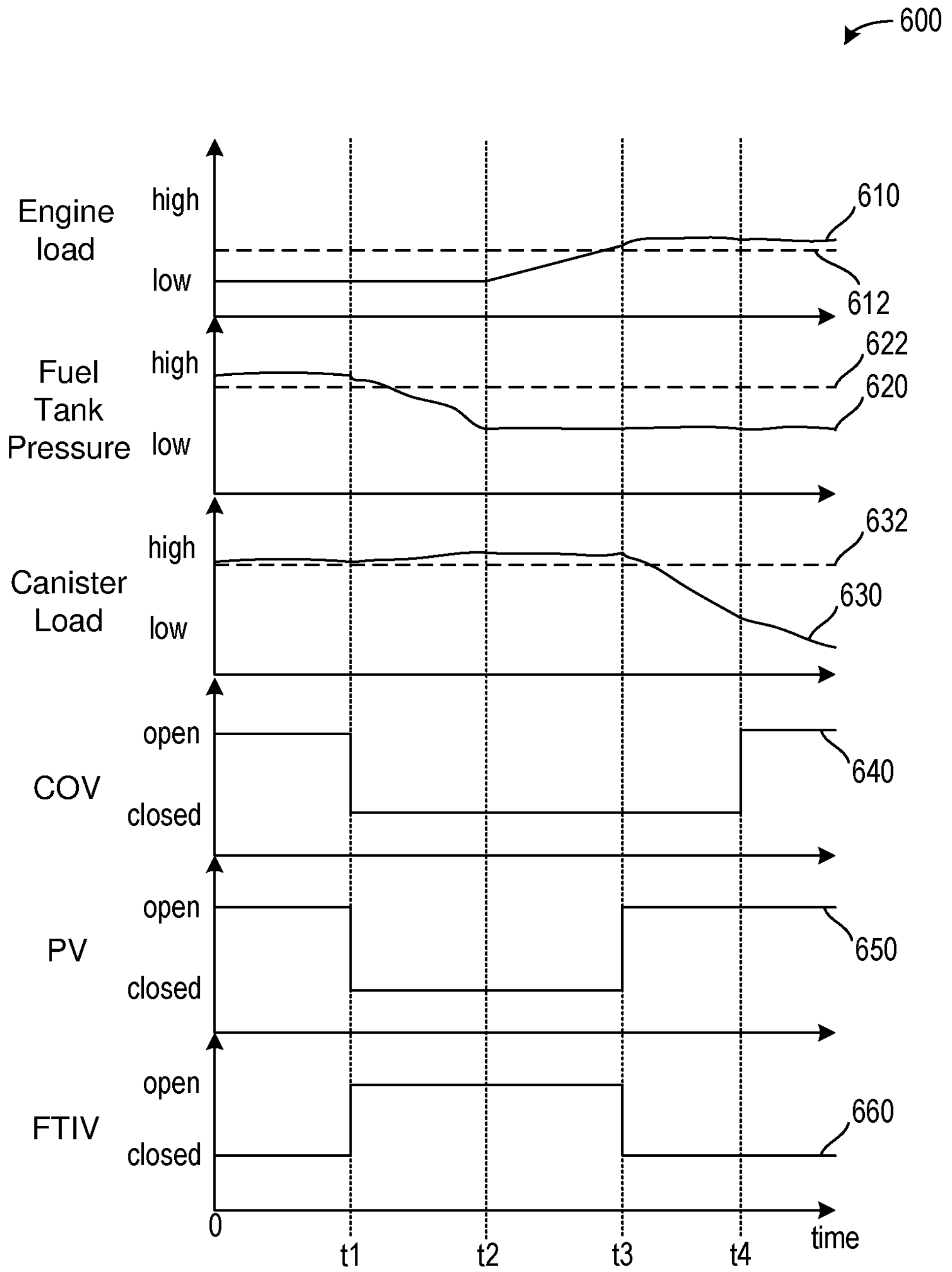
FIG. 6 graphically shows an operating sequence based on the method of FIGS. 4A and 4B.
Figure 7:
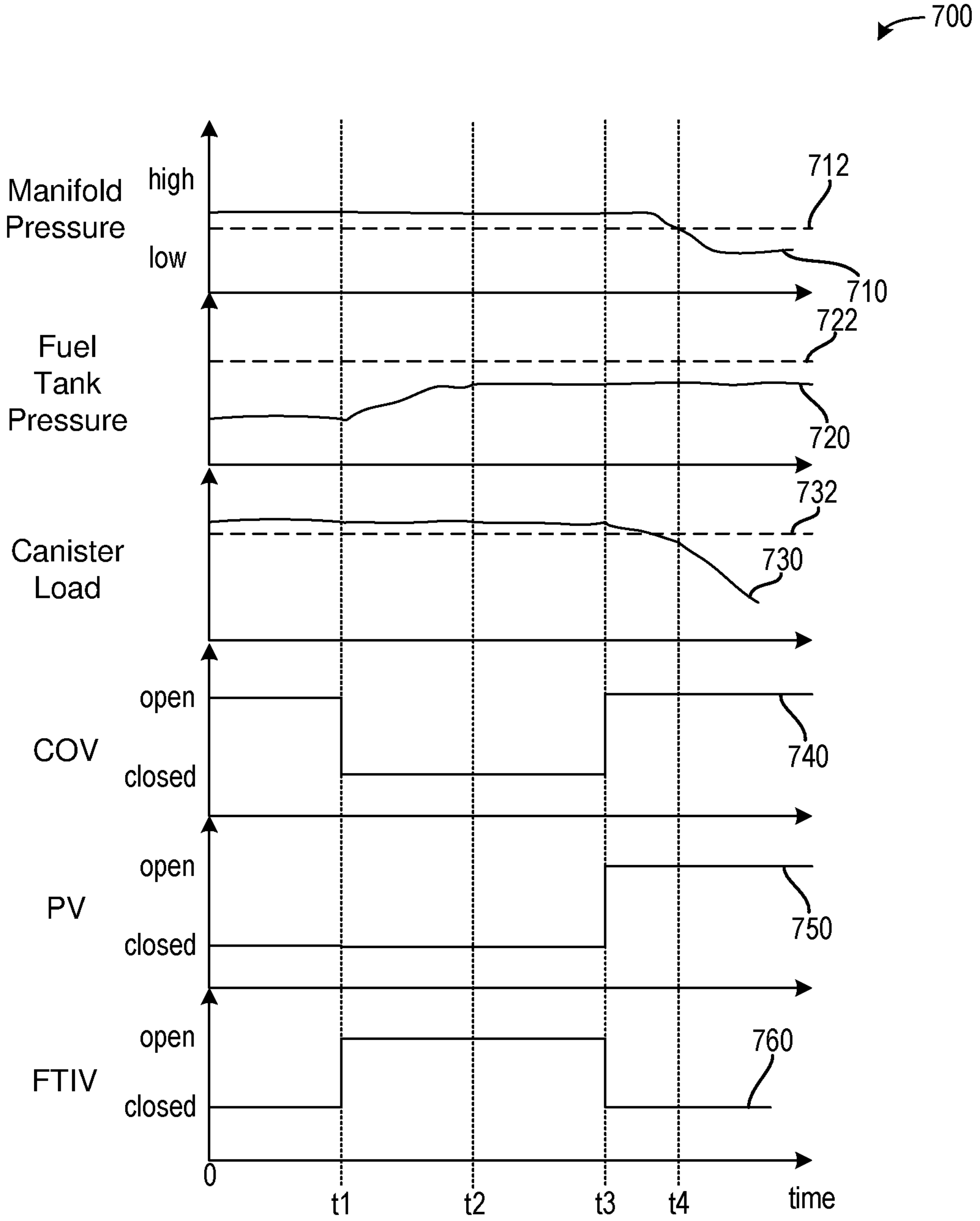
FIG. 7 graphically shows an operating sequence based on the method of FIGS. 5A and 5B.

The following description relates to systems and methods for an evaporative emissions system (evap system) and a fuel system of a vehicle. The vehicle may be an at least partially electric vehicle including an all-electric mode. FIG. 1 shows a high-level block diagram illustrating an example vehicle propulsion system. FIG. 2 shows an example engine system, fuel system, and evap system included in the example vehicle system of FIG. 1. FIGS. 3A and 3B show different positions of a change-over valve (COV) of an evaporative leak check module (ELCM). FIGS. 4A and 4B show a method for opening a fuel tank to an evap system when a fuel tank pressure is high and an engine load is low. FIGS. 5A and 5B show a method for purging a canister with a fuel tank vacuum. FIG. 6 graphically shows an operating sequence based on the method of FIGS. 4A and 4B. FIG. 7 graphically shows an operating sequence based on the method of FIGS. 5A and 5B.

FIGS. 1-3B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (e.g., set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative energy recovery of the vehicle to reduce speed. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a friction pedal and/or a foot pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may be disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle, such as from solar or wind energy. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

In an alternative embodiment, the vehicle instrument panel 196 may communicate audio messages to the operator without display. Further, the sensor(s) 199 may include a vertical accelerometer to indicate road roughness. These devices may be connected to control system 190.

FIG. 2 shows a schematic depiction of a vehicle system 206. The vehicle system 206 includes an engine system 208 coupled to an evaporative emissions control system 251 and a fuel system 218. Emissions control system 251 includes a fuel vapor container such as fuel vapor canister 222 which may be used to capture and store fuel vapors. In some examples, vehicle system 206 may be a hybrid electric vehicle system, such as the vehicle propulsion system 100 of FIG. 1.

The engine system 208 may include engine 210 having a plurality of cylinders 230. In one example, engine 210 is an embodiment of engine 110 of FIG. 1. The engine 210 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more emission control devices 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 218 may include a fuel tank 220 coupled to a fuel pump system 221. In one example, fuel tank 220 includes fuel tank 144 of FIG. 1. The fuel pump system 221 may include one or more pumps for pressurizing fuel delivered to the injectors of engine 210, such as an example injector 266 shown. While a single injector 266 is shown, additional injectors are provided for each cylinder. It will be appreciated that fuel system 218 may be a return-less fuel system, a return fuel system, or various other types of fuel system.

Vapors generated in fuel system 218 may be routed to the evaporative emissions control system 251, which includes fuel vapor canister 222 via vapor line 231, before being purged to the engine intake 223. Vapor line 231 may be coupled to fuel tank 220 via one or more conduits and may include one or more valves for isolating the fuel tank during certain conditions. For example, vapor line 231 may be coupled to fuel tank 220 via one or more or a combination of conduits 271, 275, and 276.

Further, in some examples, one or more fuel tank vent valves may be positioned in conduits 271, 275, or 276. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a fuel tank isolation valve (FTIV) 252. Conduit 275 may include a relief valve (RV) 285. In one example, the conduit 275 is a bypass conduit, wherein the RV 285 is configured to flow vapors to the canister 222 when the FTIV 252 is closed. Further, in some examples, vapor line 231 may be coupled to a refueling system 219. In some examples, refueling system 219 may include a fuel cap 205 for sealing off the fuel filler system from the atmosphere. Refueling system 219 is coupled to fuel tank 220 via a fuel filler pipe 211.

Further, refueling system 219 may include a refueling lock 245. In some embodiments, the refueling lock 245 may be a fuel cap locking mechanism. The fuel cap locking mechanism may be configured to automatically lock the fuel cap 205 in a closed position so that the fuel cap cannot be opened. For example, the fuel cap 205 may remain locked via refueling lock 245 while pressure or vacuum in the fuel tank 220 is greater than a threshold. In response to a refueling request, e.g., a vehicle operator initiated request via actuation of a refueling button on a vehicle dashboard (such as refueling button 197 on vehicle instrument panel 196 of FIG. 1), the fuel tank may be depressurized and the fuel cap unlocked after the pressure or vacuum in the fuel tank falls below a threshold. Herein, unlocking the refueling lock 245 may include unlocking the fuel cap 205.

In some embodiments, refueling lock 245 may be a filler pipe valve located at a mouth of fuel filler pipe 211. In such embodiments, refueling lock 245 may not prevent the removal of fuel cap 205. Rather refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be a refueling door lock, such as a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Emissions control system 251 may include one or more fuel vapor canisters 222 (herein also referred to simply as canister) filled with an appropriate adsorbent, the canisters configured to temporarily trap fuel vapors (including vaporized hydrocarbons) generated during fuel tank refilling operations and "running loss" vapors (that is, fuel vaporized during vehicle operation). In one example, the adsorbent used is activated charcoal. The emissions control system 251 may be interchangeably referred to herein as an evaporative emissions control system and/or an evap system. Emissions control system 251 may further include a canister ventilation path or vent line 227 which may route gases out of the fuel vapor canister 222 to the atmosphere when storing, or trapping, fuel vapors from fuel system 218. When the emissions control system 251 includes more than one canister 222, the canisters may be arranged in series or in parallel. When the canisters are arranged in series, gases may be routed to a first canister of the more than one canisters, then from the first canister to a second canister of the more than one canisters, and so on for additional canisters of the one or more canisters. When the canisters are arranged in parallel, a total volume of gases routed through the more than one canisters may be routed to the first canister or the second canister, or the total volume of gases may be divided into two volumes with a first volume of the two volumes routed through the first canister and a second volume of the two volumes routed through the second canister.

Vent line 227 may also allow fresh air to be drawn into canister 222 via vent valve 229 when purging stored fuel vapors from fuel system 218 to engine intake 223 via purge line 228 and purge valve 261. For example, purge valve 261 may be normally closed but may be opened during certain conditions (such as certain engine running conditions) so that vacuum from engine intake manifold 244 is applied on the fuel vapor canister for purging. In some examples, vent line 227 may include an optional air filter 259 disposed therein upstream of canister 222. Flow of air and vapors between canister 222 and the atmosphere may be controlled by canister vent valve 229.

Evaporative emission detection routines may be intermittently performed by controller 212 on fuel system 218 to confirm that the fuel system is not degraded. As such, evaporative emission detection routines may be performed while the engine is off (engine-off leak test) using engine-off natural vacuum (EONV) generated due to a change in temperature and pressure at the fuel tank following engine shutdown and/or with vacuum supplemented from a vacuum pump. Alternatively, evaporative emission detection routines may be performed while the engine is running by operating a vacuum pump and/or using engine intake manifold vacuum. Evaporative emission tests may be performed by an evaporative leak check module (ELCM) 295 communicatively coupled to controller 212. ELCM 295 may be coupled in vent line 227, between canister 222 and the vent valve 229. ELCM 295 may include a vacuum pump configured to apply a negative pressure to the fuel system when in a first conformation, such as when administering a leak test. ELCM 295 may further include a reference orifice and a pressure sensor 296. Following the application of vacuum to the fuel system, a change in pressure at the reference orifice (e.g., an absolute change or a rate of change) may be monitored and compared to a threshold. Based on the comparison, evaporative emissions from the fuel system may be identified. The ELCM vacuum pump may be a reversible vacuum pump, and thus configured to apply a positive pressure to the fuel system when a bridging circuit is reversed placing the pump in a second conformation.

Canister 222 may include a first buffer 224 surrounding load port 213. Like canister 222, buffer 224 may also include adsorbent. The volume of buffer 224 may be smaller than (e.g., a fraction of) the volume of canister 222. The adsorbent in the buffer 224 may be same as, or different from, the adsorbent in the canister (e.g., both may include charcoal). Buffer 224 may be positioned within canister 222 such that during canister loading through load port 213, fuel tank vapors are first adsorbed within the buffer, and then when the buffer is saturated, further fuel tank vapors are adsorbed in the main body of the canister. In comparison, when purging canister 222 with air drawn through vent line 227, fuel vapors are first desorbed from the canister (e.g., to a threshold amount) before being desorbed from the buffer. In comparison, when purging canister 222 with air drawn through vent line 227, fuel vapors are first desorbed from the canister (e.g., to a threshold amount) before being desorbed from the buffer. In other words, loading and unloading of buffer 224 is not linear with the loading and unloading of the canister. As such, the effect of the canister buffer is to dampen any fuel vapor spikes flowing from the fuel tank to the canister, thereby reducing the possibility of any fuel vapor spikes going to the engine or being released through a tailpipe.

Fuel tank 220 is fluidically coupled to canister 222 via an outlet conduit 276, the outlet conduit 276 diverging from the fuel tank isolation valve (FTIV) 252 which controls the flow of fuel tank vapors from fuel tank 220 and through the inlet conduit 271 into canister 222. By adjusting a position of FTIV 252, fuel vapor flow from the fuel tank 220 to the canister 222 can be varied. FTIV 252 may be actuated to a first, open position that couples fuel tank 220 to canister 222 via conduit 276. In an example where the emissions control system 251 includes more than one canister 222 arranged in parallel, adjusting the position of the FTIV 252 to a first position may direct fuel vapor flow from the fuel tank 220 to a first canister, adjusting to a second position may direct fuel vapor flow from the fuel tank 220 to a second canister, and adjusting to a third position may direct fuel vapor flow from the fuel tank 220 to both the first and the second canisters. The FTIV 252 may also be actuated to a fourth, closed position.

For example, FTIV 252 may be actuated to a closed position that seals fuel tank 220 from canister 222 when the emissions control system 251 includes one canister 222, wherein no fuel vapors flow through conduit 276. Controller 212 may command an FTIV position based on fuel system conditions including an operator request for refueling, fuel tank pressure, and canister load. In a second example, a 0.03" orifice is included in the place of FTIV 252 to restrict vapor flow to the canister.

In configurations where the vehicle system 206 is a hybrid electric vehicle (HEV), fuel tank 220 may be configured as a sealed fuel tank that can withstand pressure fluctuations typically encountered during normal vehicle operation and diurnal temperature cycles (e.g., steel fuel tank). In addition, the size of the canister 222 may be reduced to account for the reduced engine operation times in a hybrid vehicle. However, for the same reason, HEVs may also have limited opportunities for fuel vapor canister purging operations. Therefore, the use of a sealed fuel tank with a closed FTIV (also referred to as NIRCOS, or Non-Integrated Refueling Canister Only System), prevents diurnal and running loss vapors from loading the fuel vapor canister 222, and limits fuel vapor canister loading via refueling vapors only. FTIV 252 may be selectively opened responsive to a refueling request to depressurize the fuel tank 220 before fuel can be received into the fuel tank via fuel filler pipe 211. In particular, when the emissions control system 251 includes one canister 222, FTIV 252 may be actuated to the first open position to depressurize the fuel tank to the canister via first conduit 276 and canister load port 213.

In some embodiments (not shown), a pressure control valve (PCV) (e.g., RV 285) may be configured in a conduit coupling fuel tank 220 to canister 222 in parallel to conduit 276. When included, the RV may be controlled by the powertrain control module (e.g. controller 212) using a pulse-width modulation cycle to relieve any excessive pressure generated in the fuel tank, such as while the engine is running. Additionally or optionally, the RV may be pulse-width modulated to vent excessive pressure from the fuel tank when the vehicle is operating in electric vehicle mode, for example in the case of a hybrid electric vehicle.

When transitioned to a second (open) position for the emissions control system 251 with one canister 222, FTIV 252 allows for the venting of fuel vapors from fuel tank 220 to canister 222. The second open position may be a fully open position and the first open position may be a partially open position, e.g., half open.

For the emissions control system 251 with at least one canister 222, including more than one canister 222 arranged in parallel, fuel vapors may be stored in canister 222 while air stripped off fuel vapors exits into atmosphere via canister vent valve 229. Stored fuel vapors in the canister 222 may be purged to engine intake 223, when engine conditions permit, via the purge valve 261. Refueling lock 245 may be unlocked to open a fuel cap after fuel tank is sufficiently depressurized, such as below the second threshold pressure.

The RV 285 may open during conditions where the fuel tank pressure exceeds a threshold fuel tank pressure without input from controller 212. This may occur during conditions where the controller 212 is asleep, which may occur when the engine is off and/or when the vehicle is off. Venting events when the controller 212 is asleep may go untracked in other examples, leading to insufficient canister cleanings, which may result in vapors being released to atmosphere. This may be exacerbated in hybrid vehicles where the engine may be off for prolonged periods of vehicle operation.

The vehicle system 206 may further include a control system 214 (such as control system 190 of FIG. 1). Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device, exhaust temperature or pressure sensor 233, fuel tank pressure transducer (FTPT) or pressure sensor 291, canister load sensor 243, and ELCM pressure sensor 296. As such, pressure sensor 291 provides an estimate of fuel system pressure. In one example, the fuel system pressure is a fuel tank pressure, e.g. within fuel tank 220. Other sensors such as pressure, temperature, air/fuel ratio, and composition sensors may be coupled to various locations in the vehicle system 206. As another example, the actuators may include the fuel injector 266, the throttle 262, the FTIV 252, the refueling lock 245, the canister vent valve 229, and the purge valve 261. The control system 214 may include a controller 212. The controller may receive input data from the various sensors, process the input data, and trigger the actuators in response to the processed input data based on computer-readable instruction or code programmed therein corresponding to one or more routines. The controller 212 receives signals from the various sensors of FIGS. 1-2 and employs the various actuators of FIGS. 1-2 to adjust engine operation based on the received signals and instructions stored on a memory of the controller.

FIG. 3A shows a first schematic depiction 300 of the evaporative leak check module (ELCM) 295 in a first configuration where a fuel vapor canister (such as canister 222 in FIG. 2) of the evaporative emissions control system is vented to atmosphere. FIG. 3B shows a second schematic depiction 350 of the ELCM 295 in a second configuration where the evap system is sealed from atmosphere.

ELCM 295 includes the change-over valve (COV) 396, a vacuum pump 360, and a pressure sensor 397. Vacuum pump 360 may be a reversible pump, for example, a vane pump. COV 396 may be moveable between a first and a second position. In the first position, as shown in FIG. 3A, air may flow through ELCM 295 via first flow path 320. In the second position, as shown in FIG. 3B, air may flow through ELCM 295 via second flow path 323. As illustrated, the ELCM 295 is sealed from atmosphere in the second position. In this way, the first position of FIG. 3A is an open position and the second position of FIG. 3B is a closed position. The position of COV 396 may be controlled by solenoid 310 via compression spring 303. ELCM 295 may also comprise reference orifice 340. Reference orifice 340 may have a diameter corresponding to the size of a threshold leak to be tested, for example, 0.02". In either the first or second position, pressure sensor 397 may generate a pressure signal reflecting the pressure within ELCM 295. Operation of pump 360 and solenoid 310 may be controlled via signals received from controller 212 of FIG. 2.

As shown in FIG. 3A, in the first configuration, COV 396 is in the first position, and pump 360 is deactivated. This configuration allows for air to freely flow between atmosphere and the canister via first flow path 320. This configuration may be used during a canister purging operation, for example, or during other conditions where the fuel vapor canister is to be vented to atmosphere. Upon receiving a request for refueling, the COV 396 may be actuated to the first position (first position of ELCM), to facilitate air flow through the canister and venting of the refueling vapor from the fuel tank to the canister.

As shown in FIG. 3B, COV 396 is in the second position, and pump 360 is deactivated. This configuration allows the evap system to be sealed from atmosphere. During this condition, the fuel tank may be fluidly coupled to the evap system to equilibrate a pressure of the fuel tank and the evap system. By doing this, a pressure in the fuel tank may be relieved or a fuel tank vacuum may be used to purge a canister if requested.

Turning now to FIGS. 4A and 4B, they show a method 400 for fluidly coupling a fuel tank to an evap system in response to a fuel tank pressure. Instructions for carrying out method 400 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

The method 400 begins at 402, which includes determining operating conditions. Operating conditions may include but are not limited to one or more of an engine speed, a manifold pressure, a vehicle speed, and an air/fuel ratio.

At 404, the method 400 may include determining if a fuel tank pressure is greater than or equal to an upper threshold fuel tank pressure. The fuel tank pressure may be sensed via the FTPT, in one example. The upper threshold fuel tank pressure may be based on a non-zero, positive number. The upper threshold fuel tank pressure may correspond to a pressure at which vapors may be released from the fuel tank. If operating conditions are not adjusted, then the released vapors may be expelled to atmosphere depending on a load of a canister.

If the fuel tank pressure is not greater than or equal to the upper threshold fuel tank pressure, then at 406, the method 400 may include maintaining the fuel tank sealed from the evap system. As such, the FTIV may remain in a closed position.

If the fuel tank pressure is greater than or equal to the upper threshold fuel tank pressure, then at 408, the method 400 may include determining if an engine load is greater than a threshold engine load. The threshold engine load may be based on a non-zero, positive number. In one example, the threshold engine load is equal to a lower end of a mid-load range, such as 20% engine load. If the engine load is greater than the threshold engine load, then a purge rate of the canister, and therefore the fuel tank vapors, may be relatively high and overloading of the canister may be avoided. Said another way, purging at idle or low loads below the threshold engine load may be metered and canister overloading may occur due to excessive radiant and/or solar heat.

If the engine load is greater than or equal to the threshold engine load, then at 410, the method 400 may include opening the FTIV and the PV. As such, the fuel tank may be fluidly coupled to the canister and the canister may be fluidly coupled to an intake manifold.

At 412, the method 400 may include flowing vapors to the engine. In one example, vapors from the fuel tank may flow to the canister. Canister vapors may flow to the intake manifold to be combusted in the engine.

At 414, the method 400 may include determining if the fuel tank pressure is less than the upper threshold fuel tank pressure. If the fuel tank pressure is not less than the upper threshold fuel tank pressure, then the method 400 may continue to flow vapors to the engine with the FTIV and PV open. If the fuel tank pressure is less than the upper threshold fuel tank pressure, then purging may no longer be requested and at 416, the method 400 may include closing the FTIV and PV similar to 406 described above.

Returning to 408, if the engine load is not greater than the threshold engine load, then at 418, the method 400 may include determining a canister load. The canister load may be directly measured via a sensor or estimated based on prior loading and purging events.

At 420, the method 400 may include determining if a breakthrough likelihood is greater than a threshold likelihood. Breakthrough may include where the canister becomes overloaded, such as when a canister load is greater than a threshold canister load, and releases vapors stored therein. The vapors may be released to atmosphere if the engine is unable to receive the vapors.

If the breakthrough likelihood is not greater than the threshold likelihood, then the method 400 may proceed to 410 and utilize a slower purge rate of the engine at low or idle loads. If the breakthrough likelihood is greater than the threshold likelihood, then at 422, the method 400 may include closing the COV in the ELCM module. As such, the evap system may be sealed from atmosphere.

At 424, the method 400 may include closing the PV and opening the FTIV. As such, the evap system may be sealed from the intake manifold. Additionally, the fuel tank may be fluidly coupled to the evap system. In this way, a volume of the fuel tank may be fluidly coupled to conduits and components of the evap system. By doing this, an effective volume of the fuel tank may be increased.

At 426, the method 400 may include flowing fuel tank vapors into the sealed evap system. The pressure of the fuel tank may decrease while a load of the canister may increase. Despite being highly loaded (e.g., a load greater than the threshold canister load), the increased pressure presented by the fuel tank vapors may force hydrocarbons (HC) stored in the canister deeper into a catalyst bed. The fuel tank vapors may be stored in the canister and reside in conduits of the evap system. As such, the canister may be configured to store more vapors under higher pressures. By doing this, the fuel tank pressure may be alleviated via the canister without a chance of breakthrough.

At 428, the method 400 may monitor the engine load to determine if the engine load is greater than the threshold engine load. If the engine load is not greater than the threshold engine load, then the fuel tank may remain fluidly coupled to the evap system. If the engine load is greater than the threshold engine load, then at 430, the method 400 may include closing the FTIV and sealing the fuel tank from the evap system.

At 432, the method 400 may include opening the PV. The intake manifold may be fluidly coupled to the canister and vapors from the canister may flow to the intake manifold. The vapors in the manifold may flow to the engine for combustion.

At 434, the method 400 may include determining if a canister pressure is equal to a threshold canister pressure. In one example, the threshold canister pressure is based on a non-zero, positive number. The threshold canister pressure may be based on atmospheric pressure (e.g., 1 atm). If the canister pressure is not equal to the threshold canister pressure, then at 436, the method 400 may include maintaining the COV closed. If the canister pressure is equal to the threshold canister pressure, then at 438, the method 400 may include opening the COV. The evap system is fluidly coupled to atmosphere.

Turning now to FIGS. 5A and 5B, they show a method 500 for purging the canister via manifold vacuum or fuel tank vacuum based on conditions. At 502, the method 500 may include determining a canister load.

At 504, the method 500 may include determining if the canister load is greater than the threshold canister load. The threshold canister load may be based on an upper load of the canister (e.g., 90% loading), wherein purging may be requested. If the canister load is not greater than or equal to the threshold canister load, then at 506, the method 500 not purging the canister due to a purging request not being present (e.g., absent).

If the canister load is greater than or equal to the threshold canister load, then a purging request is present and at 508, the method 500 may include determining a manifold pressure. The manifold pressure may be sensed via a pressure sensor (e.g., a MAP) or estimated based on one or more of a throttle position, a vehicle speed, and an engine speed.

At 510, the method 500 may include determining if the manifold pressure is less than or equal to a threshold manifold pressure. In one example, the threshold manifold pressure is based on a vacuum of the manifold. The threshold manifold pressure may be equal to 0 or −0.5 in. Hg. If the manifold pressure is less than the threshold manifold pressure, then at 512, the method 500 may include using the manifold vacuum to purge the canister.

At 514, the method 500 may include opening the PV. The manifold and canister may be fluidly coupled.

At 516, the method 500 may include maintaining the FTIV closed. As such, the fuel tank is sealed from the evap system. Additionally or alternatively, the COV may be maintained open.

At 518, the method 500 may include flowing canister vapors to the intake manifold. Positive pressure from atmosphere and vacuum from the manifold may promote vapors from the canister to flow to the intake manifold where the vapors may be directed to the engine for combustion.

At 520, the method 500 may include determining if the canister load is less than the threshold canister load. If the canister load is not less than the threshold canister load, then the method may continue to flow vapors to the intake manifold.

If the canister load is less than the threshold canister load, then the purging request may be fulfilled and at 522, the method 500 may include closing the PV. The canister may be sealed from the manifold and purging may be blocked.

Returning to 510, if the manifold pressure is not less than or equal to threshold manifold pressure, then an engine load may be relatively low and the manifold pressure may not be sufficient to purge the canister. Said another way, the manifold may not include vacuum.

The method 500 proceeds to 524 following “no” at 510, which include determining if the fuel tank pressure is less than a lower threshold fuel tank pressure. The lower threshold fuel tank pressure may be equal to the threshold manifold pressure or based on a current manifold pressure. For example, the lower threshold fuel tank pressure may be a dynamic value that is set to be less than the current manifold pressure.

If the fuel tank pressure is not less than the lower threshold fuel tank pressure, then the method 500 proceeds to 506 as described above. If the fuel tank pressure is less than the lower threshold fuel tank pressure, then at 526, the method 500 may include using the fuel tank vacuum to purge the canister.

At 528, the method 500 may include closing the COV to seal the evap system from atmosphere.

At 530, the method 500 may include closing the PV to seal the evap system from the intake manifold.

At 532, the method 500 may include opening the FTIV to fluidly couple the fuel tank to the canister.

At 534, the method 500 may include flowing the fuel tank vacuum to the canister. The fuel tank vacuum may flow into the evap system. As such, the evap system pressure and the canister pressure may decrease and the fuel tank pressure may increase.

At 536, the method 500 may include determining if the evap system pressure is steady. The pressure may be determined to be steady based on feedback from the FTPT and/or an evap system pressure sensor (e.g., ELCM pressure sensor 296 of FIG. 2). Evap system pressure may be steady once the fuel tank pressure and the canister pressure are substantially equal. Additionally or alternatively, if the fuel tank pressure remains relatively constant (e.g., ±1-3% of a given value), then the evap system pressure is steady. If the pressure is not steady (e.g., fuel tank pressure is not equal to evap system pressure), then the method 500 may continue flowing vacuum to the canister from the fuel tank. If the pressure is steady, then at 538, the method 500 may include closing the FTIV to seal the fuel tank from the canister.

At 540, the method 500 may include opening the COV to fluidly couple atmosphere to the evap system.

At 542, the method 500 may include open the PV to fluidly couple the canister to the manifold.

At 544, the method 500 may include flowing fresh air from atmosphere to the canister.

At 546, the method 500 may include flowing canister vapors to the manifold. The positive pressure of the fresh air along with the motive force of the canister vacuum may force the canister vapors toward the manifold.

At 548, the method 500 may include combusting vapors in the engine.

At 550, the method 500 may include determining if the canister load is less than the threshold canister load. If the canister load is not less than the threshold canister load, then canister vapors may continue to flow to the manifold.

If the canister load is less than the threshold canister load, then at 552, the method 500 may include closing the COV and the PV. Purging of the canister may be complete.

In some examples, the engine load may be monitored when the fuel tank vacuum is used to purge the canister. If the engine load is greater than the threshold engine load, then the manifold pressure may be relatively low (e.g., less than the threshold manifold pressure) and a higher purge rate may be utilized by using manifold vacuum.

Turning now to FIG. 6, it shows a graph 600 graphically illustrating conditions of a fuel system, an evap system, and an engine system when a fuel tank pressure is high and an engine load is low. Plot 610 illustrates an engine load and dashed line 612 illustrates a threshold engine load. Plot 620 illustrates a fuel tank pressure and dashed line 622 illustrates an upper threshold fuel tank pressure. Plot 630 illustrates a canister load and dashed line 632 illustrates a threshold canister load. Plot 640 illustrates a COV position. Plot 650 illustrates a PV position. Plot 660 illustrates a FTIV position. Time increases from a left to a right side of the figure.

Prior to t1, the engine load is less than the threshold engine load. The fuel tank pressure is greater than the upper threshold fuel tank pressure. The canister load is greater than the threshold canister load. As such, the engine may not be operating at a load to consume vapors without a high likelihood of vapor breakthrough from the canister.

At t1, the COV is closed, the PV is closed, and the FTIV is opened. As such, the evap system is sealed from atmosphere and the manifold while being fluidly coupled to the fuel tank. Between t1 and t2, the fuel tank pressure decreases and the canister load increases. Fuel tank vapors fill the evap system and force stored hydrocarbons deeper into a catalyst bed of the canister.

At t2, the fuel tank pressure is less than the upper threshold fuel tank pressure. Between t2 and t3, the fuel tank pressure remains steady and the engine load begins increasing. At t3, the engine load is greater than the threshold engine load. As such, the engine may consume vapors at a purge rate sufficient to avoid breakthrough vapors. The PV is actuated to an open position and the FTIV is actuated to a closed position.

Between t3 and t4, the canister load begins to decrease as vapors therefrom are purged to the engine. At t4, the canister load is relatively low and a pressure thereof may be correspondingly low such that the COV is actuated open. In one example, the COV is commanded open once the canister pressure is less than an ambient pressure. After t4, the purging event continues.

Turning now to FIG. 7, shows a graph 700 graphically illustrating conditions of a fuel system, an evap system, and an engine system when a canister load is high and a manifold pressure is low. Plot 710 illustrates a manifold pressure and dashed line 712 illustrates a threshold manifold pressure. Plot 720 illustrates a fuel tank pressure and dashed line 722 illustrates a lower threshold fuel tank pressure. Plot 730 illustrates a canister load and dashed line 732 illustrates a threshold canister load. Plot 740 illustrates a COV position. Plot 750 illustrates a PV position. Plot 760 illustrates a FTIV position. Time increases from a left to a right side of the figure.

Prior to t1, the manifold pressure is greater than a threshold manifold pressure. The canister load is greater than a threshold canister load and a purging request is present. The fuel tank pressure is less than a threshold fuel tank pressure, thereby indicating a fuel tank vacuum is available. During these conditions, the fuel tank vacuum may be used in the absence of the manifold vacuum to purge the canister.

At t1, the COV is closed and the FTIV is opened. The PV is maintained closed. As such, the evap system is sealed from atmosphere and fluidly coupled to the fuel tank.

Between t1 and t2, the fuel tank vacuum flows to the canister. As such, the fuel tank pressure increases as it equilibrates with the evap system. In this way, a pressure of the evap system and the canister decreases and a pressure of the fuel tank increases.

At t2, the fuel tank pressure stops increasing. Between t2 and t3, the fuel tank pressure is steady and it no longer increases or decreases. As such, the canister may be primed to be purged independent of the manifold pressure.

At t3, the FTIV is actuated to a closed position and the fuel tank is sealed from the evap system. The PV is actuated to an open position and the COV is actuated to an open position. As such, the evap system is coupled to the manifold and atmosphere. Between t3 and t4, the canister load decreases as the canister vacuum and atmospheric pressure force vapors to the manifold.

At t4, the canister load is less than the threshold canister load. The manifold pressure begins to decrease due to an increase in engine load. After t4, the purging event continues via manifold vacuum. As such, the purging event may be executed via fuel tank vacuum and manifold vacuum separately.

In one example, the technical effect of fluidly coupling the fuel tank to the evap system to provide further conditions where fuel tank pressure may be decrease and/or conditions where canister purging may be executed. As an example, the volume of the evap system may be used to decrease a pressure of the fuel tank when engine loads are relatively low. A method may wait until engine loads increase to open the evap system to the engine to purge the canister. As another example, a fuel tank vacuum may be used to purge the canister when a manifold pressure is too high. By doing this, an increase frequency of purging may occur, which may be beneficial in vehicles with reduced engine runtimes.

The disclosure provides support for a method including fluidly coupling a fuel tank to an evaporative emissions system (evap system) and sealing the evap system from an intake manifold and atmosphere in response to a fuel tank pressure. A first example of the method further includes where the fuel tank pressure is greater than an upper threshold fuel tank pressure. A second example of the method, optionally including the first example, further includes where fluidly coupling the fuel tank to the evap system further comprises a canister load being greater than a threshold canister load. A third example of the method, optionally including one or more of the previous examples, further includes where fluidly coupling the fuel tank to the evap system further comprises a manifold pressure being greater than a threshold manifold pressure. A fourth example of the method, optionally including one or more of the previous examples, further includes where fluidly coupling the fuel tank to the evap system further comprises an engine load being less than a threshold engine load. A fifth example of the method, optionally including one or more of the previous examples, further includes where the fuel tank pressure is less than a lower threshold fuel tank pressure.

The disclosure provides additional support for a system including an engine, an evaporative emissions system (evap system) comprising a canister, a change-over valve (COV), and a purge valve (PV), a fuel system comprising a fuel tank and a fuel tank isolation valve (FTIV), and a controller comprising computer-readable instructions stored in memory that when executed cause the controller to in response to a fuel tank pressure and a load of the canister, close the COV, open the FTIV, and close the PV. A first example of the system further includes where the instructions further cause the controller to monitor the fuel tank pressure via a fuel tank pressure transducer (FTPT) and open the PV in response to the fuel tank pressure being steady. A second example of the system, optionally including the first example, further includes where the fuel tank pressure is greater than an upper threshold fuel tank pressure or less than a lower threshold fuel tank pressure and the load of the canister is greater than a threshold canister load. A third example of the system, optionally including one or more of the previous examples, further includes where the instructions further cause the controller to open the PV in response to a manifold pressure of an intake manifold of the engine being less than a threshold manifold pressure. A fourth example of the system, optionally including one or more of the previous examples, further includes where the instructions further cause the controller to open the COV in response to a pressure of the canister being less than a threshold canister pressure. A fifth example of the system, optionally including one or more of the previous examples, further includes where the instructions further cause the controller to close the COV, open the FTIV, and close the PV in response to the engine being off or an engine load being less than a threshold engine load. A sixth example of the system, optionally including one or more of the previous examples, further includes where the instructions further cause the controller to open the PV and close the FTIV in response to the engine being on and the engine load being greater than the threshold engine load. A seventh example of the system, optionally including one or more of the previous examples, further includes where the instructions further cause the controller to open the COV in response to the canister load being less than a threshold canister load. An eighth example of the system, optionally including one or more of the previous examples, further includes where the instructions further cause the controller to equilibrate a pressure of the fuel tank with a pressure of the evap system.

The disclosure provides further support for a method including in response to a canister load, a fuel tank pressure, and one of a manifold pressure or an engine load, opening a fuel tank isolation valve (FTIV), closing a change-over valve (COV), and closing a purge valve (PV). A first example of the method further includes where the canister load is greater than a threshold canister load, the fuel tank pressure is greater than an upper threshold fuel tank pressure, and the engine load is greater than a threshold engine load. A second example of the method, optionally including the first example, further includes where the canister load is greater than a threshold canister load, the fuel tank pressure is less than a lower threshold fuel tank pressure, and the manifold pressure is greater than a threshold manifold pressure. A third example of the method, optionally including one or more of the previous examples, further includes opening the PV, opening the COV, and closing the FTIV in response to the fuel tank pressure being steady. A fourth example of the method, optionally including one or more of the previous examples, further includes opening the change-over valve and opening the purge valve in response to the canister load being less than a threshold canister load and an engine being on.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:

fluidly coupling a fuel tank to an evaporative emissions system (evap system) and sealing the evap system from an intake manifold and atmosphere in response to a fuel tank pressure, wherein fluidly coupling the fuel tank to the evap system further comprises a canister load being greater than a threshold canister load.

2. The method of claim 1, wherein the fuel tank pressure is greater than an upper threshold fuel tank pressure.

3. The method of claim 1, wherein fluidly coupling the fuel tank to the evap system further comprises a manifold pressure being greater than a threshold manifold pressure.

4. The method of claim 1, wherein fluidly coupling the fuel tank to the evap system further comprises an engine load being less than a threshold engine load.

5. The method of claim 1, wherein the fuel tank pressure is less than a lower threshold fuel tank pressure.

6. A system, comprising:

an engine;

an evaporative emissions system (evap system) comprising a canister, a change-over valve (COV), and a purge valve (PV);

a fuel system comprising a fuel tank and a fuel tank isolation valve (FTIV); and a controller comprising computer-readable instructions stored in memory that when executed cause the controller to:

in response to a fuel tank pressure and a load of the canister, close the COV, open the FTIV, and close the PV, wherein the fuel tank pressure is greater than an upper threshold fuel tank pressure or less than a lower threshold fuel tank pressure and the load of the canister is greater than a threshold canister load.

7. The system of claim 6, wherein the instructions further cause the controller to monitor the fuel tank pressure via a fuel tank pressure transducer (FTPT) and open the PV in response to the fuel tank pressure being steady.

8. The system of claim 6, wherein the instructions further cause the controller to open the PV in response to a manifold pressure of an intake manifold of the engine being less than a threshold manifold pressure.

9. The system of claim 8, wherein the instructions further cause the controller to open the COV in response to a pressure of the canister being less than a threshold canister pressure.

10. The system of claim 6, wherein the instructions further cause the controller to close the COV, open the FTIV, and close the PV in response to the engine being off or an engine load being less than a threshold engine load.

11. The system of claim 10, wherein the instructions further cause the controller to open the PV and close the FTIV in response to the engine being on and the engine load being greater than the threshold engine load.

12. The system of claim 6, wherein the instructions further cause the controller to open the COV in response to the canister load being less than the threshold canister load.

13. The system of claim 6, wherein the instructions further cause the controller to equilibrate a pressure of the fuel tank with a pressure of the evap system.

14. A method, comprising:

in response to a canister load, a fuel tank pressure, and one of a manifold pressure or an engine load, opening a fuel tank isolation valve (FTIV), closing a change-over valve (COV), and closing a purge valve (PV), wherein the canister load is greater than a threshold canister load, the fuel tank pressure greater than an upper threshold fuel tank pressure, and the engine load greater than a threshold engine load.

15. The method of claim 14, wherein the canister load is greater than the threshold canister load, the fuel tank pressure is less than a lower threshold fuel tank pressure, and the manifold pressure is greater than a threshold manifold pressure.

16. The method of claim 15, further comprising opening the PV, opening the COV, and closing the FTIV in response to the fuel tank pressure being steady.

17. The method of claim 14, further comprising opening the change-over valve and opening the purge valve in response to the canister load being less than the threshold canister load and an engine being on.

18. A method, comprising:

fluidly coupling a fuel tank to an evaporative emissions system (evap system) and sealing the evap system from an intake manifold and atmosphere in response to a fuel tank pressure, wherein fluidly coupling the fuel tank to the evap system further comprises a manifold pressure being greater than a threshold manifold pressure.

19. A method, comprising:

fluidly coupling a fuel tank to an evaporative emissions system (evap system) and sealing the evap system from an intake manifold and atmosphere in response to a fuel tank pressure, wherein fluidly coupling the fuel tank to the evap system further comprises an engine load being less than a threshold engine load.

* * * * *